Sept. 3, 1968      J. R. MARTIN      3,399,459
MEASURING INSTRUMENT
Filed Oct. 15, 1965      8 Sheets-Sheet 1
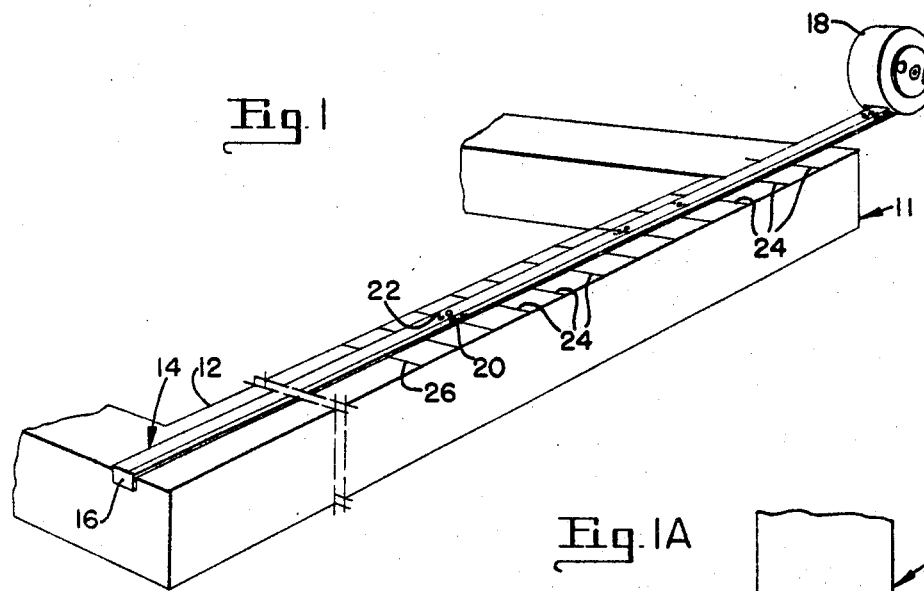
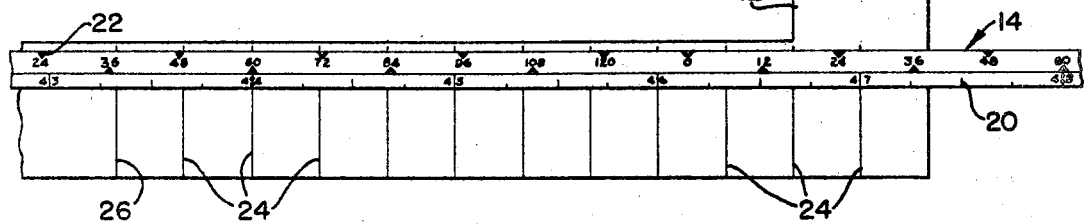
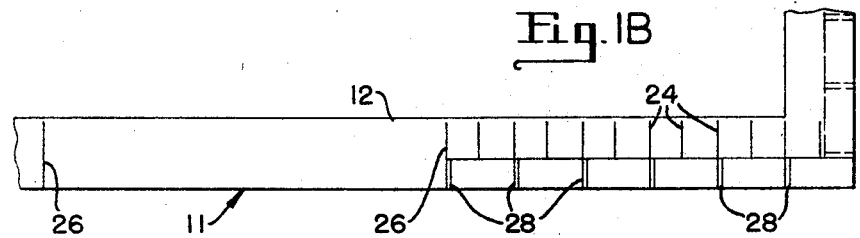
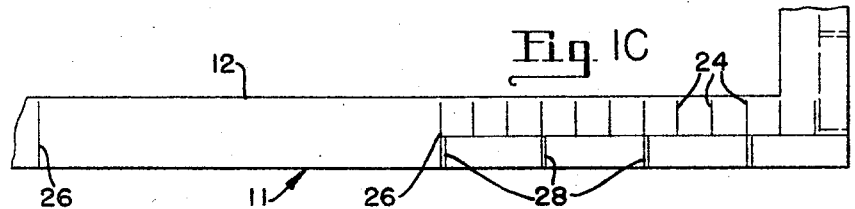
JERALD R. MARTIN
*INVENTOR.*
BY
*Wayland D. Keith*
HIS AGENT

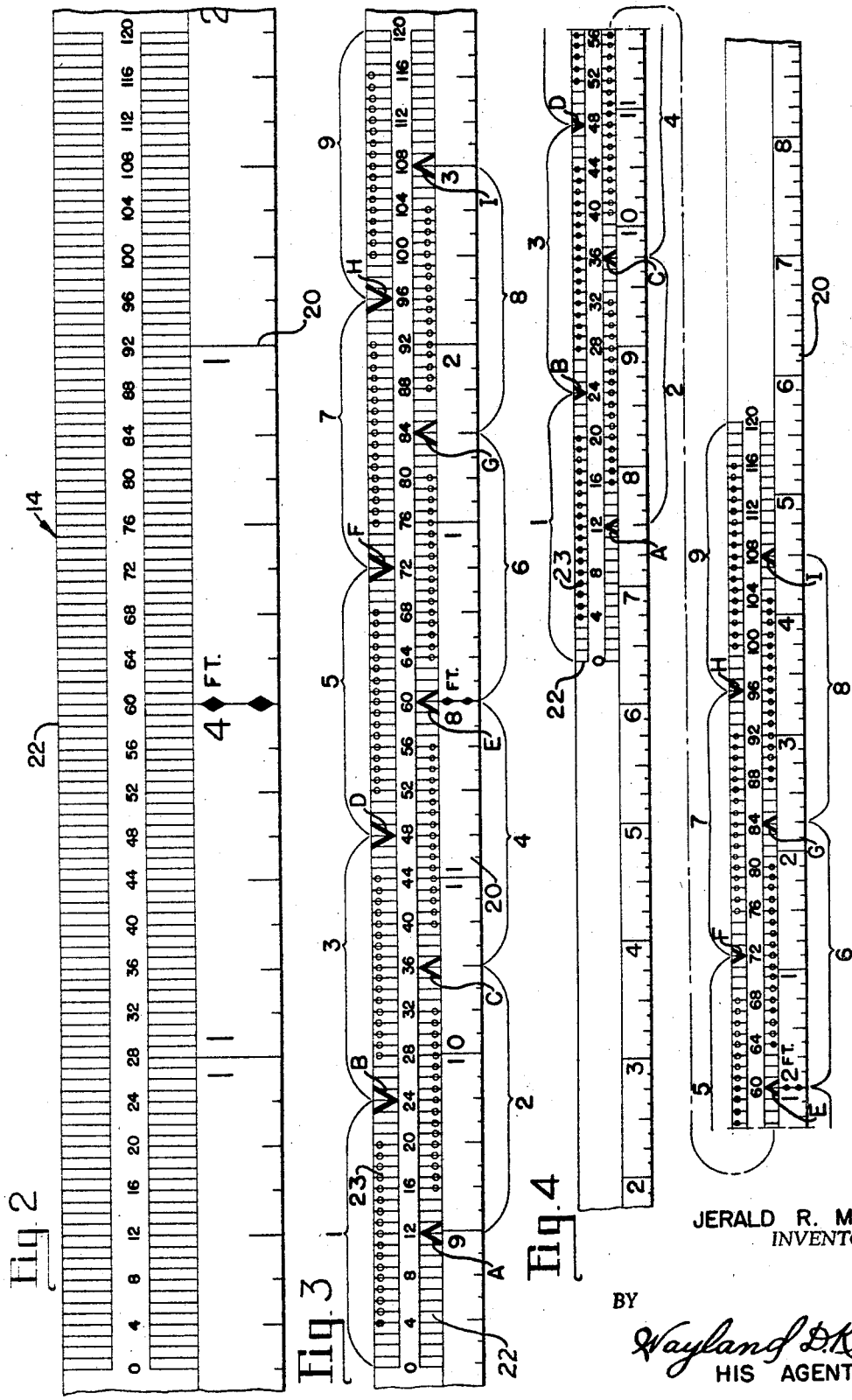

Sept. 3, 1968 J. R. MARTIN 3,399,459
MEASURING INSTRUMENT
Filed Oct. 15, 1965 8 Sheets-Sheet 3
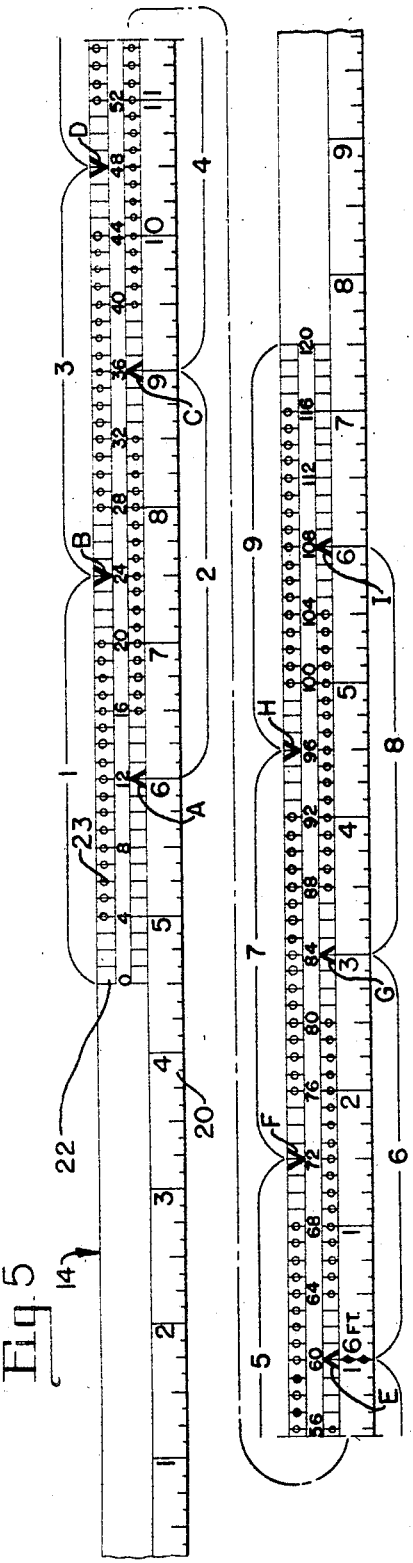
Fig. 5
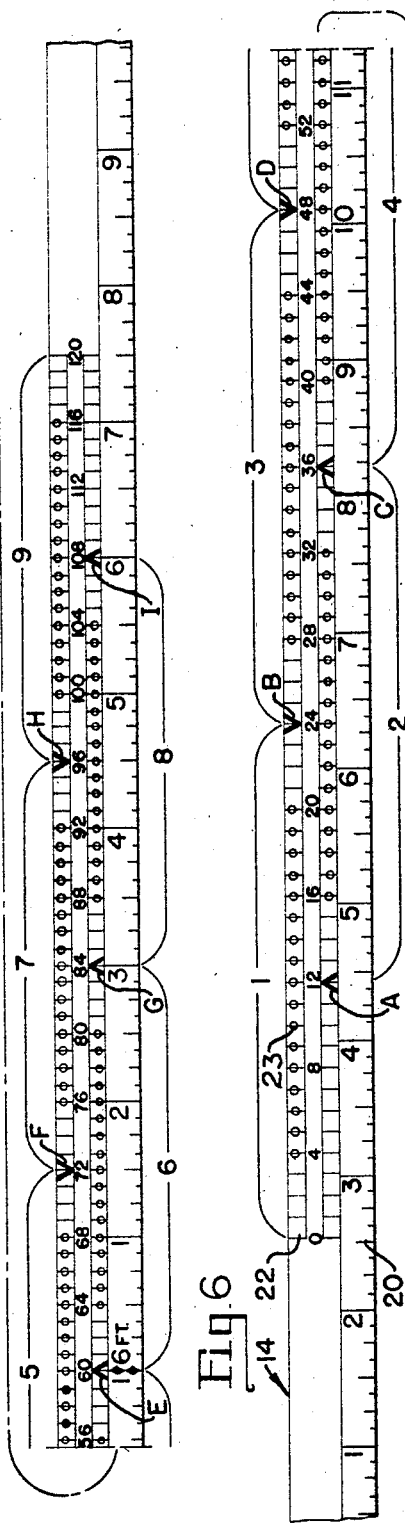
Fig. 6
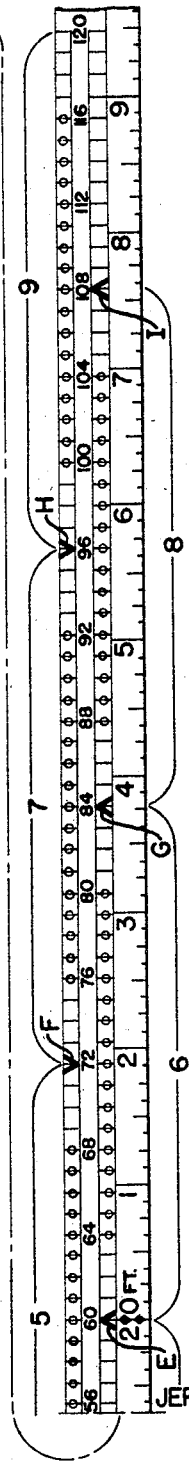
JERALD R. MARTIN
INVENTOR.
BY
*Wayland D Keith*
HIS AGENT

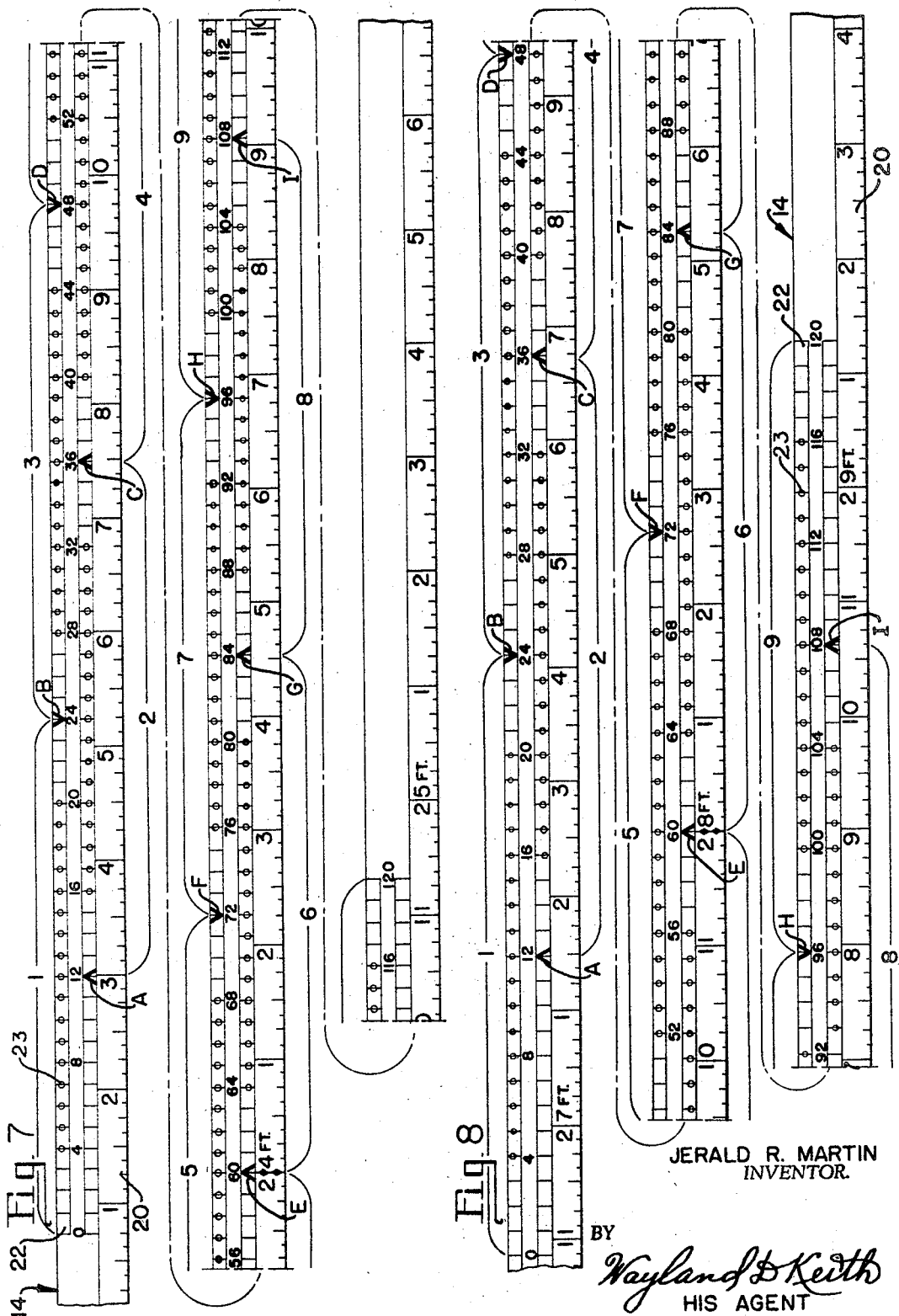

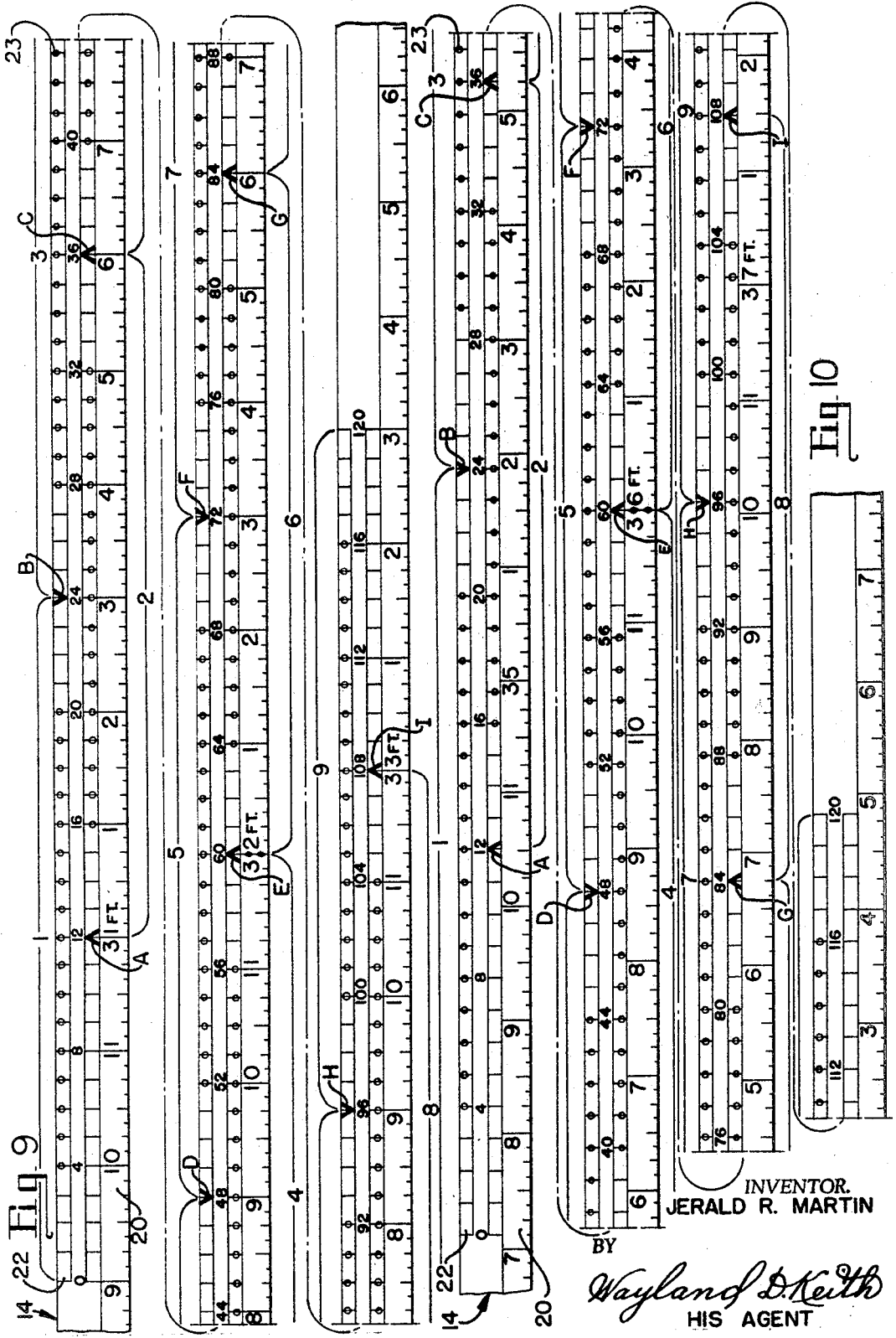

Sept. 3, 1968

J. R. MARTIN 3,399,459

MEASURING INSTRUMENT

Filed Oct. 15, 1965

JERALD R. MARTIN
INVENTOR.

BY

*Wayland D. Keith*

HIS AGENT

United States Patent Office 3,399,459
Patented Sept. 3, 1968

3,399,459
MEASURING INSTRUMENT
Jerald R. Martin, 2805 W. 20th St.,
Plainview, Tex. 79072
Filed Oct. 15, 1965, Ser. No. 496,523
9 Claims. (Cl. 33—111)

ABSTRACT OF THE DISCLOSURE

A masonry measuring tape used in conjunction with a table to enable bricks of random lengths to be laid in a lineal course on a foundation of a given length, so the brick laid will occupy the same lineal space on the foundation in whole brick and brick widths, with the vertical mortar joints being substantially uniform width throughout the entire length of the course, and to determine the number of bricks of random lengths necessary to complete the laying of a course, including the mortar joints, so that each course, as laid in predetermined, controlled unit lengths so brick may be laid without having to cut bricks within the length of the foundation. Further provision is made, on the same tape, to lay masonry units of different lengths in the course.

---

This invention relates to a masonry measure and more particularly to a masonry tape to enable the laying out and calculating the placement of brick of random lengths on a foundation. With the mean average length of random brick calculated, the masonry tape is used to lay out and mark, as for instance, approximately four foot control units, for the first lineal course on a foundation, when the English system of measurement is used, so as to give a predetermined width vertical mortar joints between the brick, so that the brick, when laid in a course to make a wall, will end in an accepted full length brick or in a brick width, without having to cut, saw, or chip bricks within the length of the course, or having to make extra wide or narrow vertical mortar joints. When other systems of measurement are used, such as the metric system, a control unit of measure may be so used as to accomplish the same result.

In the laying of brick, if all bricks were 7⅝", 11⅝" or other uniform length and all distance from the first brick to the last brick are laid out on four foot units of length, it is a relatively simple matter to calculate the number of bricks within a course and to lay the bricks into a wall so the brick will come out even without having to break or saw any of the brick. However, all brick are not of uniform length or modular size, and all distances on the foundation are not laid out in four foot units of length therefore, it has been difficult, by the use of present methods, to calculate how to lay a lineal course of brick within a wall so it will come out in even brick length or half brick length, without having to cut or saw the brick, or make extra wide or thin vertical mortar joints.

By the use of the present tape measure, and by following certain rules and tables in connection therewith, bricks of random lengths, within certain variations, can be readily calculated to be laid into a wall so that each lineal course will come out in a half brick or a whole brick.

The present tape is so designed that the length of the foundation on which the brick are to be laid may be measured, then by measuring ten to fifteen brick within the stack, to determine the exact length of each brick, to within ¹⁄₁₆ of an inch, then by taking the mean average length as the unit of length to be used, and then by the utilization of a range size table, a range number can be determined. Then by using this range number in connection with the description hereinafter set out, the random length brick may be accurately laid out in approximately four foot control unit measures, for the length of the foundation, so each course will come out in brick widths or a full brick length. By the use of the present system, the correct range is established and the correct procedure followed, a brick mason, with average experience, can lay lineal courses of brick, one after another, with substantially the same thickness vertical mortar joints, and make the masonry work appear uniform, and without having to tighten or lengthen the width of the vertical mortar joint and without having to cut or saw brick. It is preferable to have the bricks laid with a standard ⅜" masonry joint, however there is an accepted tolerance, which is usually ¹⁄₁₆" less than the ⅜" to ¹⁄₁₆" more than the standard ⅜" vertical mortar joint.

The present tape is directed primarily, as a matter of explanation, to this particular standard, however, it is to be understood that this unit of measure for the brick and for the bond is representative, and that the tape may be made for use with masonry units of varying lengths with the vertical mortar joints being of varying widths, to meet the requirements of particular applications of masonry work, as, in laying glazed tile, mortar joints of ¼" thickness are usually preferable. The present tape is shown to have sixty masonry markings on each side of a four foot measuring unit on the tape, throughout the length thereof. These markings, on the first four foot unit of measure on the tape are spaced ¹⁄₃₂" apart, and the entire tape is divided into nine groups of range markings at each four foot interval, with the markings of the range groups on the tape being overlapping by one-half, in all but the first half of the first range and the last half of the last range. These groups will hereinafter be referred to as ranges with numbers 1 through 9, both for masonry units which will normally lay approximately 8" into a wall, including the vertical mortar joint and for masonry units which will lay approximately 12" into the wall including the vertical mortar joint.

By utilizing these ranges, that is, ranges 1 through 9, in combination with the tape measure, and the accompanying table to determine the range of brick to be used the entire foundation may be readily marked off to enable the laying of brick of random lengths, in controlled lengths of approximately four feet on the tape, so that the vertical mortar joint between the bricks will be substantially the same width so that the entire starting course and subsequent courses can be laid with full brick and one-half brick, without cutting or sawing any brick and yet the mortar joints will be substantially ⅜" thick, plus or minus the accepted tolerance of ¹⁄₁₆", which can be done without mathmetical calculations, except for determining the average length of a group of average brick chosen at random from the stack of brick from which the wall is to be laid.

The conventional brick, which lays approximately 8" into a wall, including the mortar joint, usually range from 7⅜" to 7⅞" in length which means that the mean average length is about 7⅝", however this cannot be accepted without question, as in the making of brick many factors enter into determining the length and width of the finished brick, among them are (1) the particular type of clay from which the brick is formed, (2) the initial cut or molded length of the clay unit preparatory to firing in the kiln, (3) the temperature at which the brick are fired and the length of time fired, (4) the particular coloring matter imparted to the brick, and (5) the moisture content of the unfired brick. These five factors have been named, although there are others which may cause variations in the finished brick, therefore it is particularly important to obtain a mean average length of the brick being used, as it is practically impossible to control the factors which cause the variations in size of the finished brick. The architect, the artisan and the individual having the work done all except the wall to have a uniform appearance without having cut brick within the length of the course, therefore, with the present system, the laying of brick within a course can be so maintained, even in view of the factors mentioned above which cause variations in the length of finished brick, which would be modular lengths, were it not for such factors, which factors cannot be controlled to such exacting accuracy as to produce brick of exact uniform lengths, without undue expense or without extensive culling of brick which would otherwise be acceptable.

While the above has been with reference to conventional brick, that is, brick which are normally from 7⅜″ to 7⅞″ in length, the width of the brick being approximately one-half the length thereof, which enables brick to be laid in long courses with the end brick of the next succeeding course being laid so the brick extends outward at an angle thereto, which will form a half brick joint on alternate courses, however, the tape is also marked with indicia which enables the laying of brick of other dimensions, for instance 12″ brick, which, when laid into a wall including the mortar joint, is approximately twelve inches in length, however, these brick are usually the same width as the 8″ regular brick, discussed above, that is four inches, including the mortar joint. Therefore, a certain portion of the table is utilized to determine the range sizes and to enable the brick to be laid into a wall so they will come out in full length brick or in lengths so that the width of a brick may be utilized in conjunction with the length, therefore it is possible for corners to be tied together in with full length brick and the width of the brick without having to cut or saw brick in order to make the courses come out in the proper manner.

The primary object of this invention is to provide a measuring device, such as a tape, to enable the thickness of the mortar joint or vertical bond in a course of brick to be so varied, by predetermined markings on the measuring device, so as to enable a given number of brick and brick widths of random lengths, wherein certain tolerances, to be laid in a linear course, in an exact measured distance, without having to cut or saw brick.

Another object of the invention is to provide a measuring device, such as a tape, to enable the determination of the number of bricks, of random length, which may be laid within a course with substantially uniform vertical mortar joints, so that the brick so laid will come out in a uniform pattern in full brick lengths or full brick lengths and brick widths within the given distance, without undue variation in the vertical mortar joints.

Still another object of the invention is to provide a tape for use in laying out lineal masonry courses which will determine the average thickness of a vertical mortar joint between the brick of random lengths, so that the brick may be laid into the wall, in a given distance, and come out in full brick, or full brick and brick widths, so as to give a uniform wall structure without having to cut or saw brick.

A further object of the invention is to provide a masonry tape which will enable a unit control mark to be laid out on a horizontal foundation so as to have a control range mark approximately every four feet, to enable the mansonry being laid to have vertical mortar joints of uniform thickness throughout the entire length of the course of brick being laid.

Yet another object of the invention is to provide a masonry tape which is so marked that it can be used to determine the correct spacing of brick of random length, in various standard sizes, such as brick which will lay eight inches into the wall, or brick which will lay twelve inches into the wall.

Still another object of the invention is to provide a tape for masonry work which will enable the lay-out of the foundation and the determination of the number of brick of random length and vertical mortar joints which will be required within a given unit length on the foundation, without having to count the brick for the length of the foundation on which the brick is to be laid, and without the necessary of cutting or sawing the brick within said unit of length.

Another object of the invention is to provide a masonry tape for horizontal measurements to enable the ready determination of how many brick of random length should be laid within a given distance, and which have the vertical mortar joints therebetween substantially uniform, without extensive culling of the brick and without having to lay the brick, within the course, by trial and error method to be able to get the correct number of brick in the initial linear starting course on the foundation.

Still a further object of this invention is to provide a tape measure for mansonry work which can be used with brick of random lengths which will normally lay 8″ or 12″ within the wall, which tape has a range code associated therewith to enable laying out the foundation so that the brick in a given unit of length will come out in uniform manner of brick and brick widths without having to cut or saw a brick.

Yet another object of the invention is to provide a tape measure for mansonry work, which tape carries a series of range markings on each four foot unit length of measurement on the tape, which range markings will enable the laying of the correct number of brick and brick widths in an exact given length and which will enable a mason of average skill to lay the brick readily without complicated calculations, and with uniform vertical mortar joints.

A final object of the invention is to provide a tape measure for masonry work which is simple in construction, easy to use by artisans, and which is low in the cost of manufacture.

With these objects in mind and others which will become manifest as the description proceeds, reference is to be had to the accompanying drawings in which like reference characters designate like parts in the several views thereof, in which:

FIG. 1 is a perspective view of a foundation, such as a concrete foundation, as provided for laying brick or other type masonry thereon, showing the concrete foundation marked off in spaces from one end of the foundation to enable the tape to be used to determine the range number to enable the correct number of random length brick to be used within the given unit of length on the foundation, with parts broken away and with parts shown in section to bring out the details of construction;

FIG. 1A is a fragmentary plan view of the concrete foundation, as shown in FIG. 1, showing the foundation marked off in uniform spaces from an end thereof, and showing a masonry tape positioned thereon to obtain a vernier reading to ascertain a range number between the tape and the marking on the foundation;

FIG. 1B is a fragmentary plan view, on a reduced scale, of a portion of a foundation, showing markings thereon at one end thereof to enable the laying of brick of random lengths in a uniform manner, and showing further spaced apart markings as control points to enable the accurate laying of brick of random length within the length of a foundation, so the bricks will come out in even brick lengths and widths to obviate the cutting of bricks, a course of brick, as laid on the foundation, being shown;

FIG. 1C is a view similar to FIG. 1B, but showing the use of a longer brick, usually referred to as 12″ brick;

FIG. 2 is a fragmentary view of a portion of the mansonry tape, enlarged three times, at the four foot interval, showing sixty markings on each side thereof, with each 4th marking being numbered from 0 to 120 which markings are normally ⅟₃₂″ apart, and from which markings the range number can be determined;

FIG. 3 is a view similar to FIG. 2, but of the eight foot division on the tape, a portion thereof being enlarged one and one-half times, showing the markings numbered and spaced apart with varying indicia and symbols thereon; markings being 2/32" apart;

FIG. 4 is a fragmentary view, on full scale, shown at the twelve foot mark, with at least six inches on either side thereof, which tape is broken intermediate the numbering sequence, but not shortened; markings being 3/32" apart;

FIG. 5 is a view similar to FIG. 4, but at the sixteen foot mark, with the spacing of the indicia markings increasing 1/32 of an inch each four feet, with the spacings between the markings on the masonry scale being 4/32 of an inch at the sixteen foot group of markings;

FIG. 6 is a view similar to FIG. 5, but at the twenty foot markings, showing the markings as spaced 5/32 of an inch apart; and showing such coding of the markings as to enable these to be readily determined while laying brick to enable the mortar joint to be maintained within the required tolerance;

FIG. 7 is a fragmentary portion of the tape, shown on full scale, at the twenty four foot marking, showing the masonry markings 6/32 of an inch apart;

FIG. 8 is a view similar to FIG. 7, but at the twenty eight foot mark, and showing the markings as being spaced 7/32" apart;

FIG. 9 is a view of the masonry marking at the thirty two foot portion of the tape, which markings are 8/32 of an inch apart;

FIG. 10 is a full scale view of a portion of the tape at the thirty six foot portion, showing the masonry markings thereon, which markings are 9/32 of an inch apart;

Figure 11:
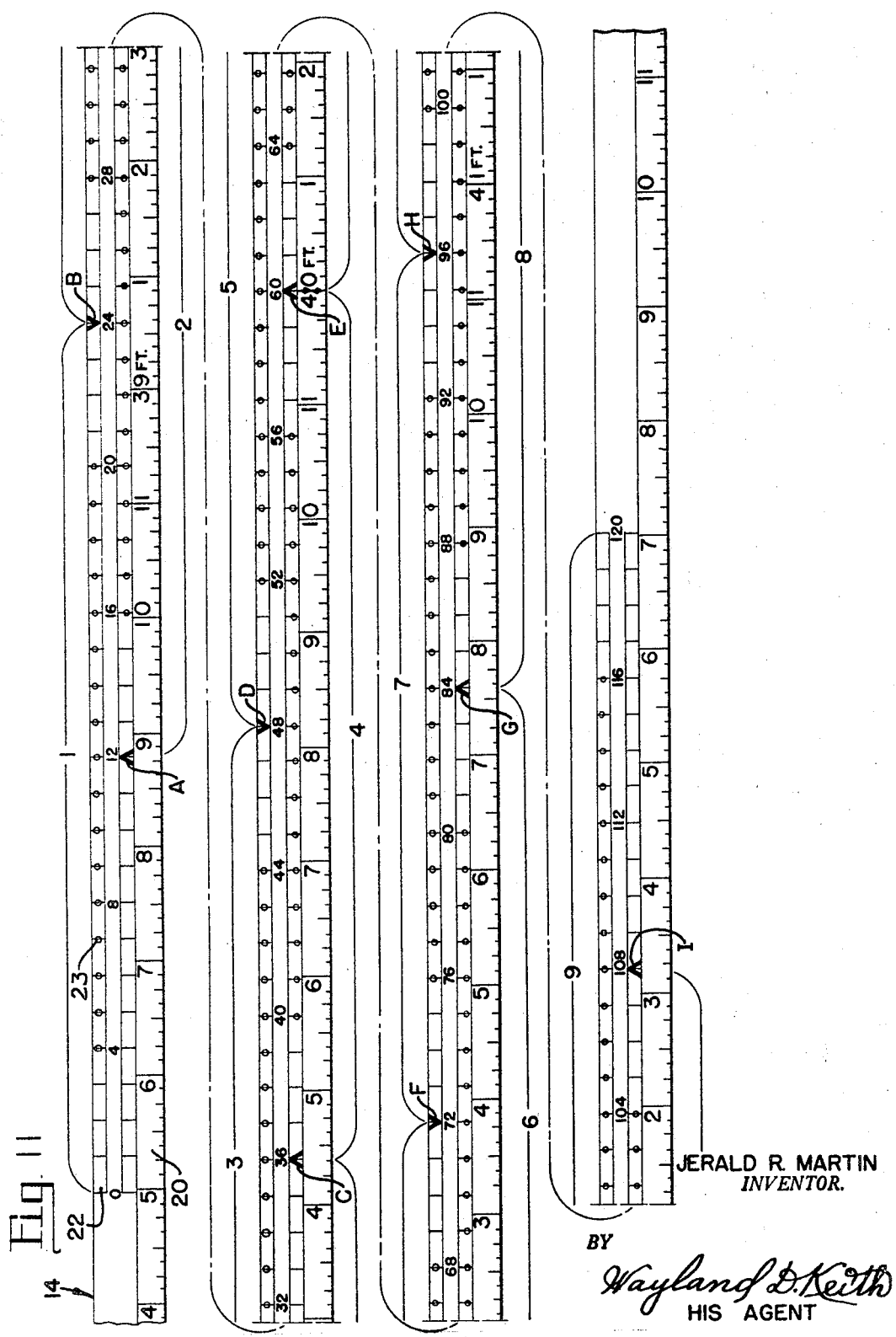
FIG. 11 is a view of the tape at the forty foot portion, showing the markings as being 10/32 of an inch apart, with sixty of the markings being on each side of the forty foot point on the tape.

With more detailed reference to the drawing, the numeral 11 designates generally a foundation, such as a concrete foundation, on which to lay brick. The foundation, as shown in FIGS. 1A, 1B, and 1C, has an upper flat face 12. A masonry tape 14 has an outturned hook 16 thereon to engage a corner of the foundation 11, which tape is adapted to be enclosed within a housing 18, in a manner well known in the art of tapes. The masonry tape, designated generally at 14, preferably has a conventional measuring indicia either along a side thereof, as indicated at 20, which indicia may be in feet and inches, or the indicia may be in accordance with the metric system, or other accepted method of measure, however, for convenience in describing the device, reference is made to the English system, but the applicant does not wish to be limited thereto. An indicia 22 may be imprinted, embossed, or otherwise applied to the tape adjacent the indicia 20, on the same side of the scale, or it may be applied to the opposite side thereof, if it is desired to make the tape of lesser width. However, for convenience of illustration, the conventional indicia 20 and the masonry indicia 22 are shown to be on the same side of the tape, which masonry indicia, on the present scale, is oriented with respect to each four foot marking on the tape 14. The scale, as shown in FIG. 2, is greatly enlarged, as it is preferable that the masonry markings be spaced apart 1/32" with sixty markings being on each side of the four foot unit of measure.

Figure 12:
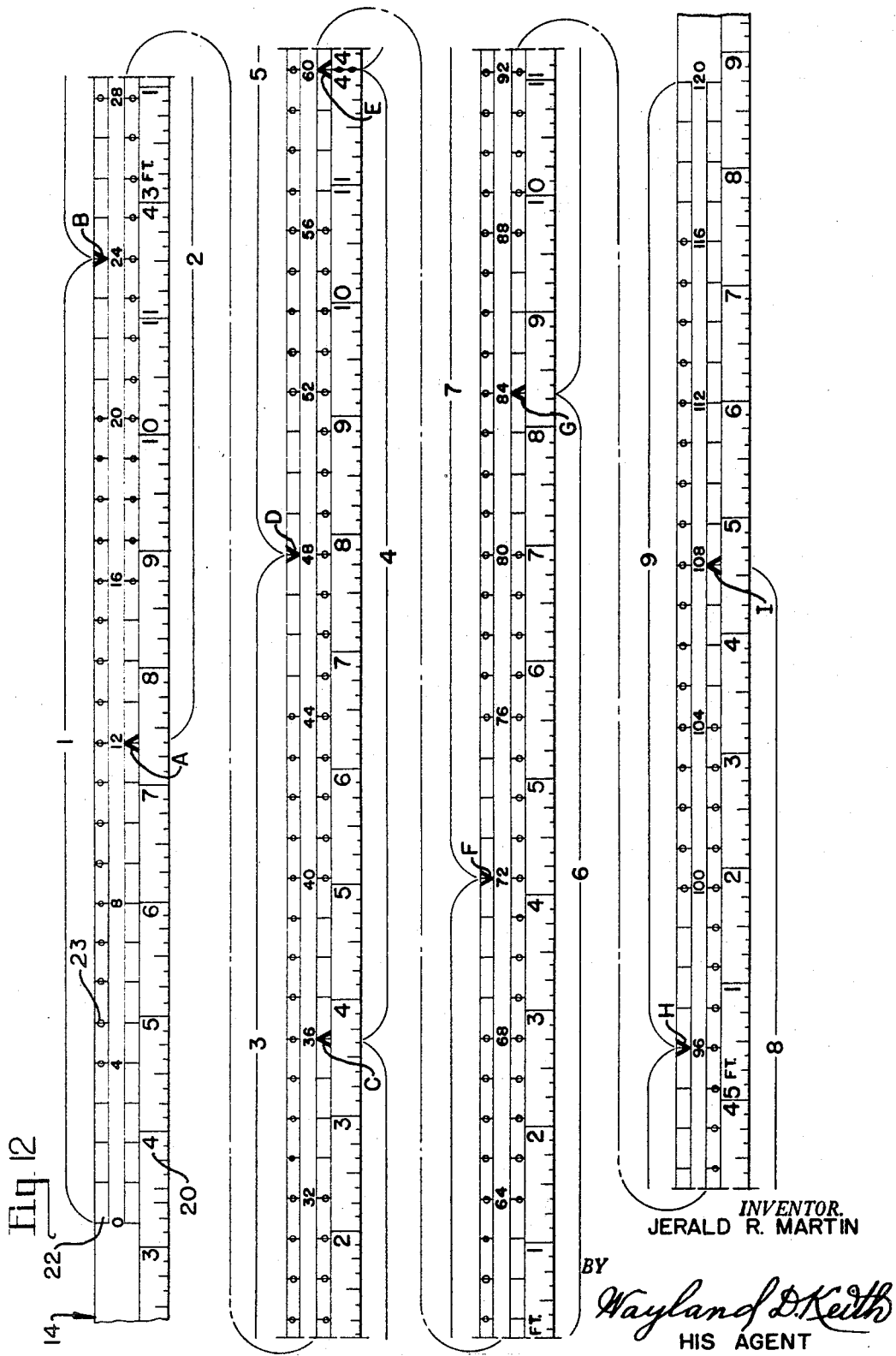
FIG. 12 is a full scale view of the tape showing the masonry markings thereon at the forty four foot portion of the tape and showing the markings as being 11/32 of an inch apart.
Figure 13:
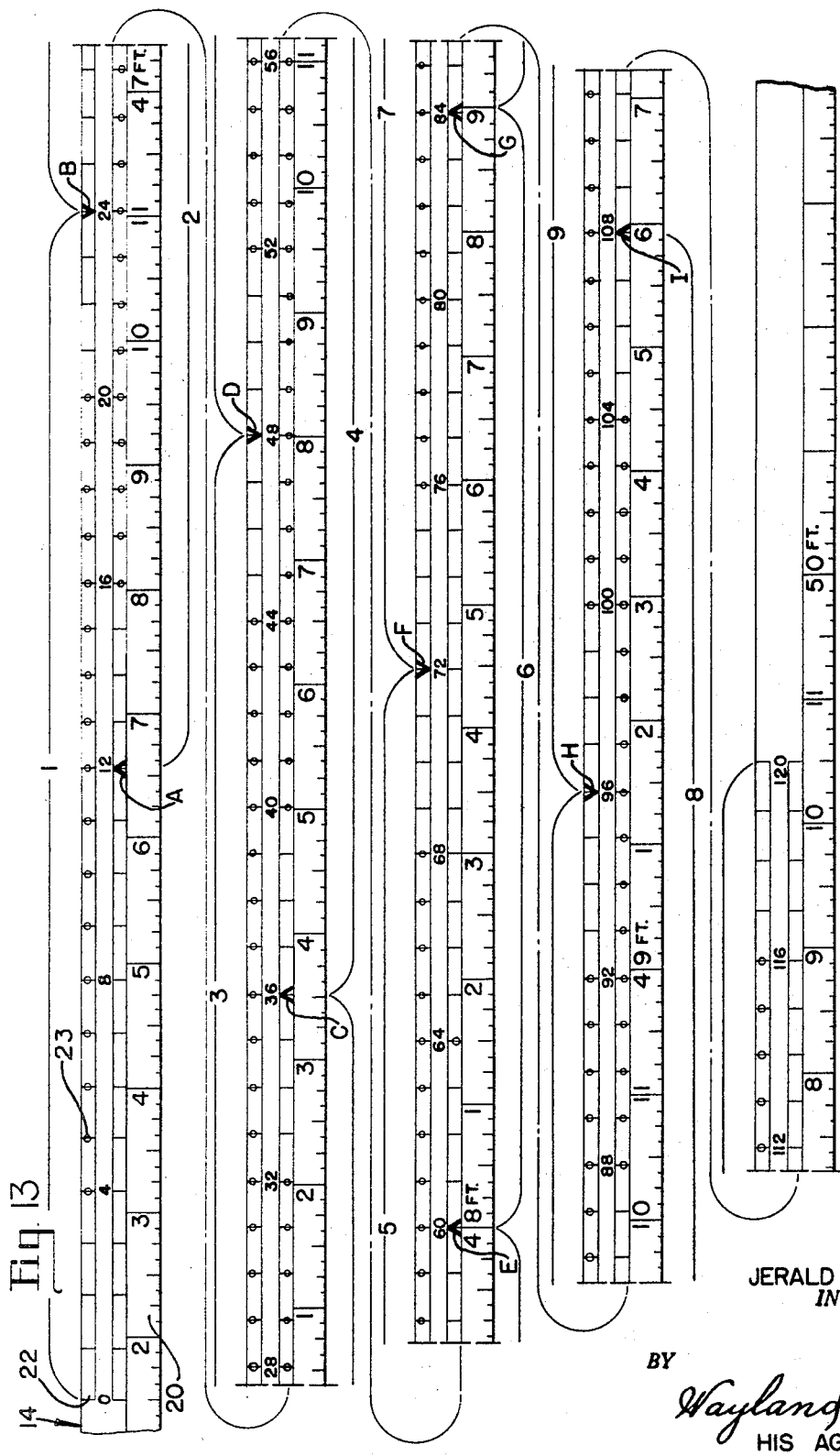
FIG. 13 is a full scale view showing the markings on the tape at the forty eight foot point, with the markings on each side thereof being spaced 12/32 of an inch apart.

The masonry markings 22 have each fourth space marked with a numeral from 0 to 120, to enable ready determination of the markings. Each successive four foot unit of marking, as shown in FIGS. 3 through 13, likewise has 120 spaces, sixty on each side of the four unit mark on the tape. However the markings on the eight foot unit of measurement on the tape 14 are spaced apart 2/32 of an inch, with FIG. 3 showing to be enlarged one and one-half times, for convenience in the proper illustration of the markings, without undue crowding.

Beginning with the eight foot unit on tape 14, certain other markings are associated with the masonry indicia or scale 22 to enable the masonry scale to be readily utilized by artisans so as to expedite determination of the spacing of brick on the length of the foundation on which the brick is to be laid. The masonry scale, as shown in FIG. 3, has nine V-marks, A, B, C, D, E, F, G, H, and I, which V-marks are spaced apart twelve spaces, and each adjacent V-mark on the same side of the masonry markings are twenty four spaces apart. The masonry markings from 0 to 24, the V-mark B being at the twenty fourth marking, constitutes what is hereinafter referred to as range 1, for the purpose of identifying the manner in which the masonry markings are used in connection with a scale, as will be more fully brought out hereinafter.

Range 1 overlaps range 2 by one-half of the spacings. The masonry markings 12–36 will be range 2, which is set out by V-marks A and C, which range 2 overlaps one-half the spacings of range 1 and one-half of the spacings of range 3. The masonry markings 24–48 will be range 3, which is set out by V-marks B and D, which range 3 overlaps one-half the space of range 2 and one-half the spaces of range 4. The masonry marks 36–60 will be range 4, which is set out by V-marks C and E, which range 4 overlaps one-half the spacings of range 3 and one-half the spacings of range 5. The masonry markings 48–72 will be range 5, which is set out by V-marks D and F, which range 5 overlaps one-half the spacings of range 4 and one-half the spacings of range 6. The masonry markings 60–84 will be range 6, which is set out by V-marks E and G, which range 6 overlaps the spacings of range 5 by one-half and the spacings of range 7 by one-half. The masonry markings 72–96 will be range 7, which range is set out by V-marks F and H, and range 7 overlaps the spacings of range 6 by one-half and the spacings of range 8 by one-half. The masonry markings 84–108 will be range 8, which is set out by V-marks G and I, which range 8 overlaps one-half the spacings of range 7 and one-half the spacings of range 9. The masonry markings 96–120 will be range 9, which extends from V-mark H to the end of the masonry scale and overlaps the spacings of range 8 by one-half.

The overlapping relation of the various ranges, as set out above enables a minute gradation of spacing, and by utilizing these particular ranges, in accordance with a table, hereinafter set out, brick of random lengths, within certain tolerances, can be laid throughout the entire length of the foundation, either with a full brick or full bricks and the width of a brick, without having to saw or cut bricks. The above ranges are for bricks which lay up substantially 8" within a wall, including the mortar joint. The manner of using ranges with other lengths of brick will be treated hereinafter.

The following table enables determining the range sizes of various length bricks that lay 8" and 12" into a wall, in accordance with the markings on the masonry tape 14:

TABLE

| Range No. | 8 in. brick mean average brick length (in.) | Masonry scale markings | 12 in. brick mean average brick length (in.) | Masonry scale markings (circle on line) |
|---|---|---|---|---|
| 1 | 7 9/16 | 0–24 | 11 9/16 | 4–20 |
| 2 | 7 7/16 | 12–36 | 11 7/16 | 16–32 |
| 3 | 7 8/16 | 24–48 | 11 8/16 | 28–44 |
| 4 | 7 9/16 | 36–60 | 11 9/16 | 40–56 |
| 5 | 7 10/16 | 48–72 | 11 10/16 | 52–68 |
| 6 | 7 11/16 | 60–84 | 11 11/16 | 64–80 |
| 7 | 7 12/16 | 72–96 | 11 12/16 | 76–92 |
| 8 | 7 13/16 | 84–108 | 11 13/16 | 88–104 |
| 9 | 7 14/16 | 96–120 | 11 14/16 | 100–116 |

With the mean average length of the particular brick to be used established, such as a 7 10/16" brick, to obtain the range number, as for instance range 5, four feet is measured off on the flat face 12 of foundation 11, from one end thereof, and at each 4″ interval, as indicated at 24, of the four feet, a line is drawn across the foundation, which will serve to establish a masonry scale marking, when the tape is measured from the opposite end of the foundation, whereupon, one of the 4″ spaced apart markings 24 on the flat face 12 of the foundation which most nearly coincides with or between two V-marks in the previously selected range, such as E nearest the 4″ interval on the tape, is utilized to determine the masonry marking to be used. With this determined, the length of the foundation is measured off at approximately each four foot interval on the tape, at the masonry markings 60, until the entire length of the foundation has been laid out in approximately 4′ spacings 26 of measurement, however, since the masonry mark could be less or more than 4′ in length, it will give the correct mortar joint, so bricks which have a mean average length of 7¹⁰⁄₁₆″ will lay up in a course of brick for the entire length of the foundation with all mortar joints being substantially uniform and with the course coming out in whole brick or brick widths. Each 4 ft. length 26 measured on the foundation is utilized to lay six brick, therefore the length of the vertical mortar joints 28 may be accurately controlled each four feet, plus or minus any adjustment for bricks in accordance with the range size, which the masonry marks, such as indicia 22, automatically give to compensate for the variation from the mean average length of the brick, and which will give a vertical mortar joint of ⅜″ thickness, plus or minus ¹⁄₁₆″.

By having the masonry markings 22 increasing progressively in length from ¹⁄₃₂″ in the first four foot unit of measurement by ¹⁄₃₂″ on each succeeding four foot unit of measurement, and by utilizing the lay-out method set out above, tape 14 combined with the masonry scale 22 and the markings 24, spaced apart 4″ on the initial foundation layout, the coinciding of the masonry markings 22 with one of the twelve markings 24 on the foundation 11 acts as a vernier to determine the place on the foundation where the approximately four foot apart control marks 26 will be placed, as shown in FIGS. 1B and 1C. In this manner the brick laid, as shown in FIG. 1B are controlled at each approximately four foot control interval 26 throughout the length of the foundation.

Then, by starting the next course of regular brick, spaced the width of a brick inward to enable the interlocking of the brick and turning the corner, the vertical mortar joints are made mediate the length of the previously laid brick, with the vertical mortar joint aligned with the vertical mortar joint on alternate courses, the laying of courses continues until the wall of desired height is laid. By laying brick in this manner the entire wall may be laid from end to end of the foundation without cutting of breaking brick, with the possible exception of obstructions and openings in the fall, with all of the brick being laid having the vertical mortar joints uniform.

A masonry joint of ⅜″ is the ideal width for a vertical mortar joint in brick work, however, ¹⁄₁₆″ departure from the ⅜″ either way, to lose or gain distance, still makes an attractive joint. The ¹⁄₁₆″ departure, either way, gives ⁵⁄₁₆ inch to ⁷⁄₁₆ inch variation in the width of the mortar joints. Three-fourths inch is the working distance in 48 inches, using six brick which will each lay 8″ into the wall, with the vertical mortar joints varying from ⁵⁄₁₆″ to ⁷⁄₁₆″ in width. These six vertical joints, if ⁵⁄₁₆″ wide, equal 1¹⁴⁄₁₆ and if ⁷⁄₁₆″ wide, will equal 2¹⁰⁄₁₆″, to give a variation of ¾″ between the use of ⁵⁄₁₆″ width joints and ⁷⁄₁₆″ width joints.

The present system has twenty four equally spaced markings on the tape, near each four foot interval, along the length thereof, except for the first four foot interval, which groups of markings constitute range marks for use as set out in the above table, which markings 22 are spaced ¹⁄₃₂″ apart on each side of the first foot mark, therefore there is a 2⁴⁄₃₂″ or ¾″ working distance at the first four foot mark, or twenty four different vertical mortar joints in which to gain or lose ¾″. On each succeeding four foot unit mark on the tape, the distance is ¾″ greater, as for example, at eight feet, the working distance, is 1½″ and so on for the length of the foundation on which the tape is to be used. It can be seen, from the above table, that brick varying in length from 7⅜″ to 7⅞″, comprising ranges 1 through 9, may be readily and expeditiously used and obtain the same width mortar joint, as the present masonry tape allows for accurate measuring so that the mortar joints can be calculated and compensated so as to be uniform in width in each four foot unit of measure throughout the entire length of the foundation, as, after ascertaining the correct range by the above procedure, each four foot unit of measure, plus or minus the amount of difference over or under four feet, in accordance with the range markings, gives the correct distance in which to lay the six brick, between the control markings 24 on the foundation, with the most nearly desirable width mortar joint which can be had, therefore, if the brick is 7⁹⁄₁₆″ long and the range is No. 4, and one of the transverse lines 24 coincides with the numeral 48 on the masonry scale, as at the V-mark indicated at D, this will determine that to make a more nearly ⅜″ vertical mortar joint, that the first four foot unit of measure will be three feet eleven and five-eighths inches long, in which to lay the six 8″ brick and each subsequent four foot unit will be the number of multiples of 3′–11⅝″ on which a transverse control mark 26 is made on the foundation 11. In this manner, when the end of the foundation is reached, it will come out in even brick or half brick without cutting a brick.

If the brick are of equal length, as for instance 7¹²⁄₁₆″, the brick will be in range 7 and the marks on tape nearest the center, between 72 and 96 which coincides with a transverse mark 24 on the foundation will be used. If the masonry marking 84 coincides with one of the lines 24, the brick control marks 26 may be laid from end to end of the foundation 11 at each range mark 84, on the tape, which will give a ⅜″ thick mortar joint between the brick, whereas, if it coincides with a range marking on the tape between 84 and 96, it will mean that the joint will be of greater width, and this increase in width will be automatically compensated for in marking off each line 26 and laying six brick with equal mortar joints in each measured unit, without the necessity of mathematical calculations of the variation of thickness with respect to the ⅜″ mortar joint, which will be within ¹⁄₁₆ of ⅜″, with all vertical mortar joints being of uniform width. It takes 21 feet and 8 inches to gain or lose 2 inches in using brick which lay up approximately eight inches into the wall.

The range marks 23, which have circles thereon, FIGS. 3 through 13, are the same spacing as the masonry marks 22 used for "regular" or brick which lay 8″ into the wall, however, there are seventeen range marks 23, defining sixteen spaces for 12″ brick, eight spaces on each side of each control mark divisible by twelve centrally of each range group, 1 through 9, which control marks are associated with each range group and are spaced on each side of each 4′ unit of measure.

The range marks 23 are in each series of range groups, except the series at the first 4′ unit of measure, and each increase proportionately in length to the proportional increase in length of the immediate preceding series of groups plus the length of the first series of spacings between the masonry marks on scale 22. In this manner the spacing of the range marks increase in arithmetical progression. The use of a measure which utilizes the English system of feet and inches, the first group of range marks are spaced ¹⁄₃₂″ apart, and considering eight of the spaces of masonry scale 23 on each side of control markings divisible by 12, this gives ¹⁶⁄₃₂″ or ½″ working distance each succeeding 4′ unit of measure. The working distance for the group of sixteen masonry spaces 23 is ½″ greater, so it can be appraised that, using these range marks for 12″ brick, laid into the wall, it takes 32 feet to gain or lose two inches.

The above specification for masonry marks 22 and 23 are illustrative of the use of range marks in laying out foundations for 8″ brick laid into the wall; and for 12″ brick laid into the wall. It is to be understood, however, that a greater number or a lesser number of range group spacings on each side of a four foot unit of measure may be used, either with the English system, the metric system, or with any other lineal system of measure, a measuring system may be established to give the same increasing or the same decreasing arithmetical progression use of a unit measure, such as the four foot unit of measure, may be shorter by a given decrease or longer by a given increment so as to enable the measure to be flexible in use for brick, tile, concrete blocks, or various other unit spacings which must decrease or increase in a set pattern. While the description has been directed primarily to the use of brick which occupy approximate eight inches, laid into a wall, the width of which, is approximately one-half the length, reference is made to half-brick lengths, therefore, half brick length is to be broadly construed as brick widths. With brick which lay twelve inches into the wall and have a width of four inches laid into the wall, are to be considered in light of the width, rather than one-half the length, and the range tables and tape markings are calculated in this manner.

While the invention has been shown as applied to the English system of measure for masonry units, particularly for 8″ brick and 12″ brick laid into a wall, it is to be understood that this is representative, and that the device is not to be limited to use with the English system, or to use with a particular length brick or other masonry units, but other systems of measure and other units of measure may be used without departing from the spirit of the invention or from the scope of the appended claims.

Having thus shown and described the invention, what is claimed as new and desired to be secured by Letters Patent is:

1. A method of laying out lineally spaced control units on a foundation, with a calibrated lineal measure having indicia thereon; for controlling the spacing of vertical mortar joints and masonry units;
    (a) including a system using a calibrated lineal measure which has primary calibrations at uniformly spaced intervals, certain of which calibrations are designated by indicia,
        (1) said lineal measure having spaced series of secondary calibrations on each side of the spaced primary calibrations, the secondary calibrations in each series being equally spaced with the secondary calibrations of each series of secondary calibrations being arranged to extend an equal distance on each side of each primary calibration,
        (2) certain of said secondary calibrations having indicia associated therewith,
        (3) the secondary calibrations of each successive series of secondary calibrations, after the first series of secondary calibrations, increasing in length by the space between the calibrations of the preceding series of secondary calibrations plus the length of the space between calibrations of the first series of secondary calibrations,
        (4) each of the series of secondary calibrations associated with each primary calibration, except the first series of secondary calibrations, being sub-divided into groups of equal length, each sub-divided group being designated as a range, each range over-lapping the preceding range and the succeeding range by one-half the length thereof, except the first and last ranges,
        (5) each group of secondary calibrations constituting a range, having indicia associated therewith to enable the selection of a masonry control unit indicia for laying off a multiplicity of masonry control units directly from the calibrated linea lmeasure to enable a predetermined number of masonry units, including vertical mortar joints, to be laid within the length of each masonry control unit,
    (b) which method includes the steps of marking a first lineal unit on the foundation, the length of which unit is a length equal to the space between two adjacent primary calibrations on the calibrated lineal measure,
        (1) measuring a representative number of masonry units to be laid,
        (2) determining the mean average length of the masonry units so measured,
        (3) determining a range number in accordance with the mean average length of the masonry units so measured,
        (4) sub-dividing the first lineal unit into a predetermined number of equal length second lineal units, marking the foundation at each second lineal unit of length, which the second lineal units being the width of a normal masonry unit as would be laid into a wall, including a masonry mortar joint,
        (5) measuring from a point on the foundation remote from the first lineal unit on the foundation with the calibrated lineal measure until the secondary calibrations on the lineal calibrated measure most nearly intersects one of the markings on the foundation of the second lineal units,
        (6) obtaining a reading on the lineal calibrated measure to the nearest secondary calibration within the predetermined range, which most nearly intersects one of the markings of the second lineal unit, then using the distance from this secondary marking to the first primary calibration toward the point from which the measurement is being made to determine a masonry control unit measure, further measuring the foundation in these masonry control units of measure from the point where the measurements originated and marking the foundation at the respective secondary calibrations in the respective range near each of the primary calibrations to the point on the foundation where said secondary calibration, in the selected range, most nearly intersects a mark on the second lineal units.

2. A method of laying out lineally spaced control units on a foundation, with a calibrated lineal measure having indicia thereon for controlling the spacing of vertical mortar joints and masonry units; as defined in claim 1, and including the further steps of
    (a) the lineal measure having further indicia thereon near each primary calibration to denote a range,
    (b) determining the range indicia from a table, and
    (c) using the range indicia determined from the table to locate the secondary marking in the range denoted by indicia on the lineal measure, to enable the establishment of masonry control unit measures within the length of the foundation measured.

3. A method of laying out lineally spaced control units on a foundation, with a calibrated lineal measure, as defined in claim 2; wherein
    (a) the calibrated lineal measure has a further indicia mediate the length of each range control unit so as to designate the preferred vertical mortar joint for the length brick to be laid,
    (b) the further step of determining that the mortar joint is to be wider if the secondary calibration in the selected range most nearly coincides with a mark of the second lineal unit associated with the foundation if greater than the length or of a lesser width if less than the length to the indicia mediate the length of the selected range unit.

4. A method of laying out lineally spaced control units on a foundation, with a calibrated lineal measure, as defined in claim 1, and including the further step of
(a) laying an equal number of masonry units within each masonry control unit with the vertical mortar joint therebetween being substantially of uniform thickness, the masonry units being of unequal length.

5. A lineal measuring device for laying out masonry control units of a horizontal length on a foundation, which device comprises:
(a) an elongated element,
(b) uniformly spaced primary calibrations on the elongated element on at least a portion of the length thereof, at least certain of said primary calibrations having indicia associated therewith,
  (1) said elongated element having a series of secondary calibrations on each side of each of the primary calibrations, the secondary calibrations in each series being equally spaced, and series of secondary calibrations being arranged to extend an equal distance on each side of each primary calibration,
  (2) certain of said secondary calibrations having indicia associated therewith,
  (3) the secondary calibrations of each successive series of secondary calibrations, after the first series of calibrations, increasing in length by the space between the calibrations of the preceding series of secondary calibrations plus the length of the space between the calibrations of the first series of secondary calibrations, to enable the measuring of masonry control units of different lentghs throughout a given length on a foundation by directly reading the lengths on the secondary markings on the elongated element,
(c) said series of secondary calibartions being divided into groups, except the first series of secondary calibrations,
  (1) each group being designated by a range indicia, and
(d) each successive series of secondary calibrations, except the first series of said calibrations, having the range groups thereof becoming progressively longer in arithmetical progression, with the same indicia of each range bearing a definite mathematical relation to the same indicia in the same range unit in other series of secondary calibrations to enable the laying out of control units of uniform lengths.

6. A lineal measuring device for laying out masonry control units of a horizontal length on a foundation, which device comprises;
(a) an elongated element,
(b) uniformly spaced primary calibrations on the elongated element on at least a portion of the length thereof, at least certain of said primary calibrations having indicia associated therewith,
  (1) said elongated element having series of secondary calibrations on each side of each of the primary calibrations, the secondary calibrations in each series being equally spaced, and series of secondary calibrations being arranged to extend an equal distance on each side of each primary calibration,
  (2) certain of said secondary calibrations having indicia associated therewith,
  (3) the secondary calibrations of each successive series of secondary calibrations, after the first series of calibrations, increasing in length by the space between the calibrations of the preceding series of secondary calibrations plus the length of the space between the calibrations of the first series of secondary calibrations, to enable the measuring of masonry control units of different lengths throughout a given length on a foundation by directly reading the lengths on the secondary markings on the elongated element,
(c) said uniformly spaced primary calibrations on the elongated element being spaced four feet apart,
(d) sixty equally spaced units of said secondary calibrations are marked on each side of each said primary calibration,
  (1) the secondary calibrations in each primary unit of calibrations increase in length by arithmetical progression,
(e) the primary calibrations at the first four foot unit of measure has the secondary calibrations thereon spaced $\frac{1}{32}$ inch apart, with the succeeding series of secondary calibrations each becoming progressively longer by $\frac{1}{32}$ of an inch,
(f) each series of said secondary calibrations on each side of each said primary calibration being divided into nine range groups of twenty-four calibrations each,
(g) alternate range groups over-lapping by twelve spacings of said secondary calibrations on each of the range groups, except the first and last range groups.

7. A lineal measuring device for laying out masonry control units of a horizontal length on a foundation, which device comprises;
(a) an elongated element,
(b) uniformly spaced primary calibrations on the elongated element on at least a portion of the length thereof, at least certain of said primary calibrations having indicia associated therewith,
  (1) said elongated element having series of secondary calibrations on each side of each of the primary calibrations, the secondary calibrations in each series being equally spaced, and series of secondary calibrations being arranged to extend an equal distance on each side of each primary calibration,
  (2) certain of said secondary calibrations having indicia associated therewith,
  (3) the secondary calibrations of each successive series of secondary calibrations, after the first series of calibrations, increasing in length by the space between the calibrations of the preceding series of secondary calibrations plus the length of the space between the calibrations of the first series of secondary calibrations, to enable the measuring of masonry control units of different lengths throughout a given length on a foundation by directly reading the lengths on the secondary markings on the elongated element,
(c) each series of said secondary calibrations comprising sixty calibrations on each side of each said primary calibration with each series of said secondary calibrations being divided into nine range groups of sixteen ranges each, and
(d) alternate range groups over-lapping by four spacings on each of the range groups of twenty-four spacings except for the first and the last range groups.

8. A lineal measuring device for laying out masonry control units of horizontal length on a foundation, as defined in claim 7; wherein
(a) said sixteen ranges of each group each having a special indicia on certain secondary calibrations to differentiate from other range marks on each group.

9. A lineal measuring device for laying out masonry control units of horizontal length on a foundation, as defined in claim 6; wherein
(a) an indicia is located mediate the length of each range to indicate the optimum width mortar joint for each range.

References Cited

UNITED STATES PATENTS

| | | | |
|---|---|---|---|
| 787,974 | 4/1905 | Clark | 33—111 |
| 1,677,821 | 7/1928 | Graham | 33—111 |
| 2,077,828 | 4/1937 | Dombrowski | 33—111 |
| 2,140,714 | 12/1938 | Palmer | 33—111 |

FOREIGN PATENTS 838,260  11/1938  France.

HARRY N. HAROIAN, *Primary Examiner.*